A. L. PUTNAM.
METALLIC VEHICLE WHEEL.
APPLICATION FILED MAR. 15, 1915.
1,175,989.
Patented Mar. 21, 1916.
2 SHEETS—SHEET 1.
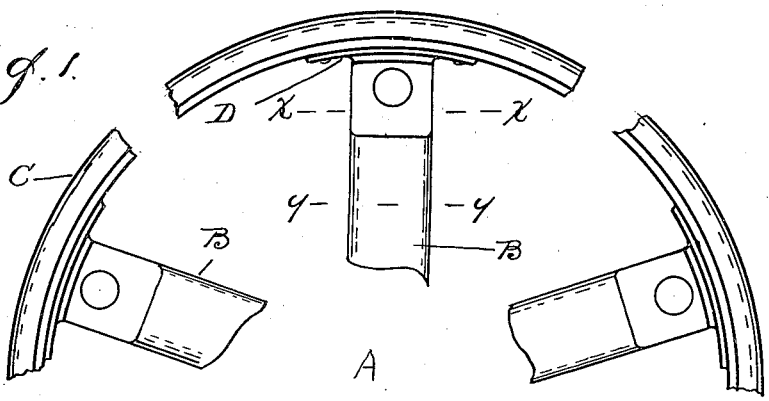
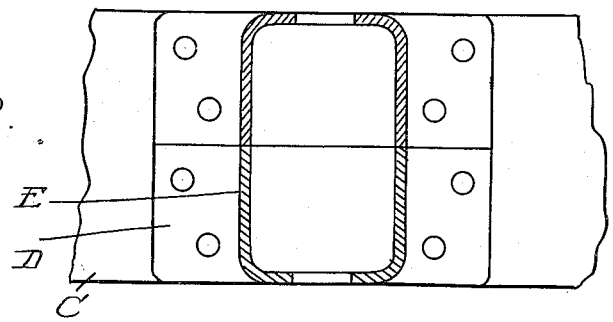
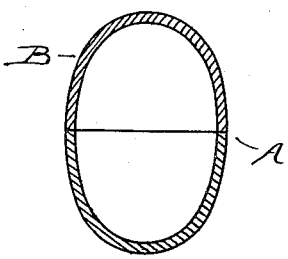
Inventor
Alden L. Putnam
By Whittemore Hulbert & Whittemore
Attorneys
Witnesses
W. L. Ford
James P. Barry A. L. PUTNAM.
METALLIC VEHICLE WHEEL.
APPLICATION FILED MAR. 15, 1915.
1,175,989.
Patented Mar. 21, 1916.
2 SHEETS—SHEET 2.
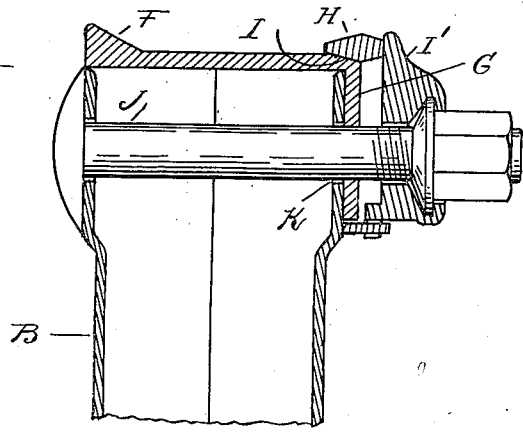
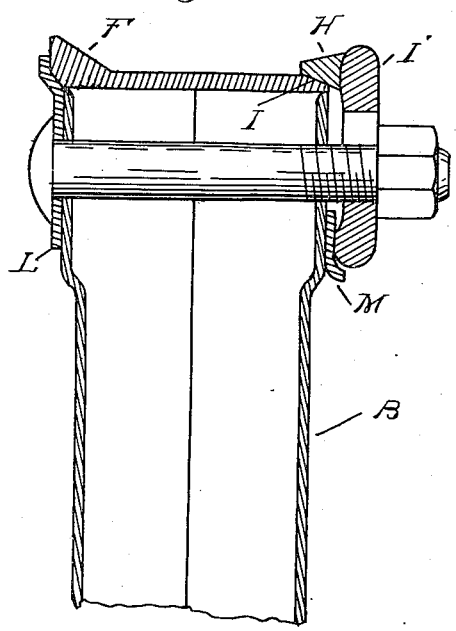
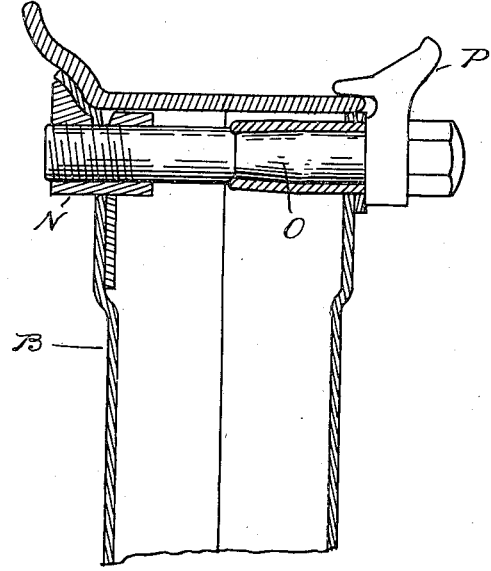
Witnesses
W. K. Find
James P. Barry
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC VEHICLE-WHEEL.

1,175,989.      Specification of Letters Patent.      Patented Mar. 21, 1916.

Application filed March 15, 1915. Serial No. 14,330.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels of that type in which the central or spider section is formed of complementary pressed sheet metal sections forming the hub and spokes, while the outer ends of the spokes are attached to a metallic rim.

It is the object of the invention to simplify the construction of attachment means between the spokes and rim, and further to obtain a construction which is adapted for use with a demountable rim and by the standard fittings used with the wood wheel constructions.

In the drawings: Figure 1 is a side elevation of a portion of the wheel of my improved construction; Fig. 2 is a section on line $x$—$x$ Fig. 1; Fig. 3 is a section on line $y$—$y$; and Figs. 4, 5 and 6 are cross sections showing my invention used in connection with different constructions of demountable rim.

In attaching demountable rims to the wood wheels it is usual to engage the attachment fittings with the felly of the wheel intermediate the spokes thereof. Metallic wheels are generally formed without a felly, and therefore the fittings which are adapted for use upon the felly of the wooden wheel are not adapted for use on metallic wheels as heretofore constructed. With my improved construction I have modified the spoke of the metallic wheel so as to provide the same with an outer portion corresponding to the cross section of the felly and therefore adapted to receive the usual fittings for the wood wheel.

In detail, A is the spider section of the wheel, which is formed of two complementary pressed steel sections, having spoke portions B, the edges of which abut against each other and are welded or otherwise secured, and C is the rim. In place of securing this rim to the spokes by some separate attachment member I form the ends of the spokes with laterally deflected flanges D, which fit within the rim and are secured thereto by spot-welding or otherwise. I further form the end portion of the spoke of a changed section, which as shown in Fig. 2 is substantially rectangular, whereas the body portion of the spoke, as shown in Fig. 3, is of an oval or rounded section. Furthermore the rectangular section E is preferably of slightly greater width so as to be the same as the width of the wood felly.

Different constructions of demountable rim may be secured to my improved wheel without any special fittings. Thus as shown in Fig. 4, the permanent rim is provided on one side with a wedge flange F and on its opposite side with an inwardly-extending flange G. The wedge ring H fitting on a wedge face I coöperates with the wedge flange F to secure the demountable rim, and this wedge ring is itself clamped by a fitting I' engaging the clamping bolt J which passes through apertures K in the spoke. The construction shown in Fig. 5 is similar, with the addition of the members L and M, which may be welded or otherwise secured to the spokes, while in the construction shown in Fig. 6, the nut fitting N is secured to one side of the spoke and the tap-bolt O is inserted from the opposite side and clamps the wedge lug P. With all these different constructions, as well as in other modifications that may be employed, the fittings which are designed for use upon the wooden felly are readily applied to the metallic construction, and engage the portion of the spoke which conforms to the section of the wooden felly.

What I claim as my invention is:

1. A metallic wheel, comprising a spider formed of complementary pressed steel sections, forming a series of spokes and meeting in the central plane of the wheel, the outer ends of said spokes having integral turned complementary flanges thereon, and a rim surrounding said spokes and secured to said flanges.

2. A metallic wheel, comprising a spider formed of complementary pressed steel sections, forming a series of spokes and meeting in the central plane of the wheel, the outer ends of said spokes having integral turned complementary flanges, and a rim surrounding said spokes spot-welded to said flanges.

3. A metallic wheel, comprising a spider section having radially-extending spokes, the outer ends of said spokes being enlarged and conforming substantially to the cross sectional contour of the usual wood felly.

4. A metallic wheel, comprising a spider formed of complementary pressed steel sections, forming a series of radial spokes, the end portions of a plurality of said spokes being changed in section and conforming substantially to the cross sectional contour of a wood felly, a rim secured to the outer ends of said spokes, and fittings for securing a demountable rim engaging the felly portions of said spokes.

5. A metallic wheel, comprising a spider section formed of complementary pressed sheet metal sections, together forming a series of radially-extending tubular spokes of rounded cross section, the outer ends of a plurality of said spokes being changed to a substantially rectangular cross section and corresponding substantially to a wood felly, a rim secured to the outer ends of said spokes, and demountable rim-engaging fittings engageable with the felly portions of said spokes.

6. A metallic wheel, comprising a spider formed of complementary pressed sheet metal sections, together forming a series of radially-extending spokes of rounded section, the outer ends of a plurality of said spokes being enlarged and changed in section to correspond substantially to a wood felly, a rim surrounding said spokes and secured thereto, a bolt passing through alined apertures in the felly portion of said spokes, and coöperating demountable rim-securing devices engaging said bolt and felly section.

In testimony whereof I affix my signature in presence of two witnesses.

ALDEN L. PUTNAM.

Witnesses:
JAMES P. BARRY,
ARTHUR D. PULVER.